Patented Oct. 30, 1951

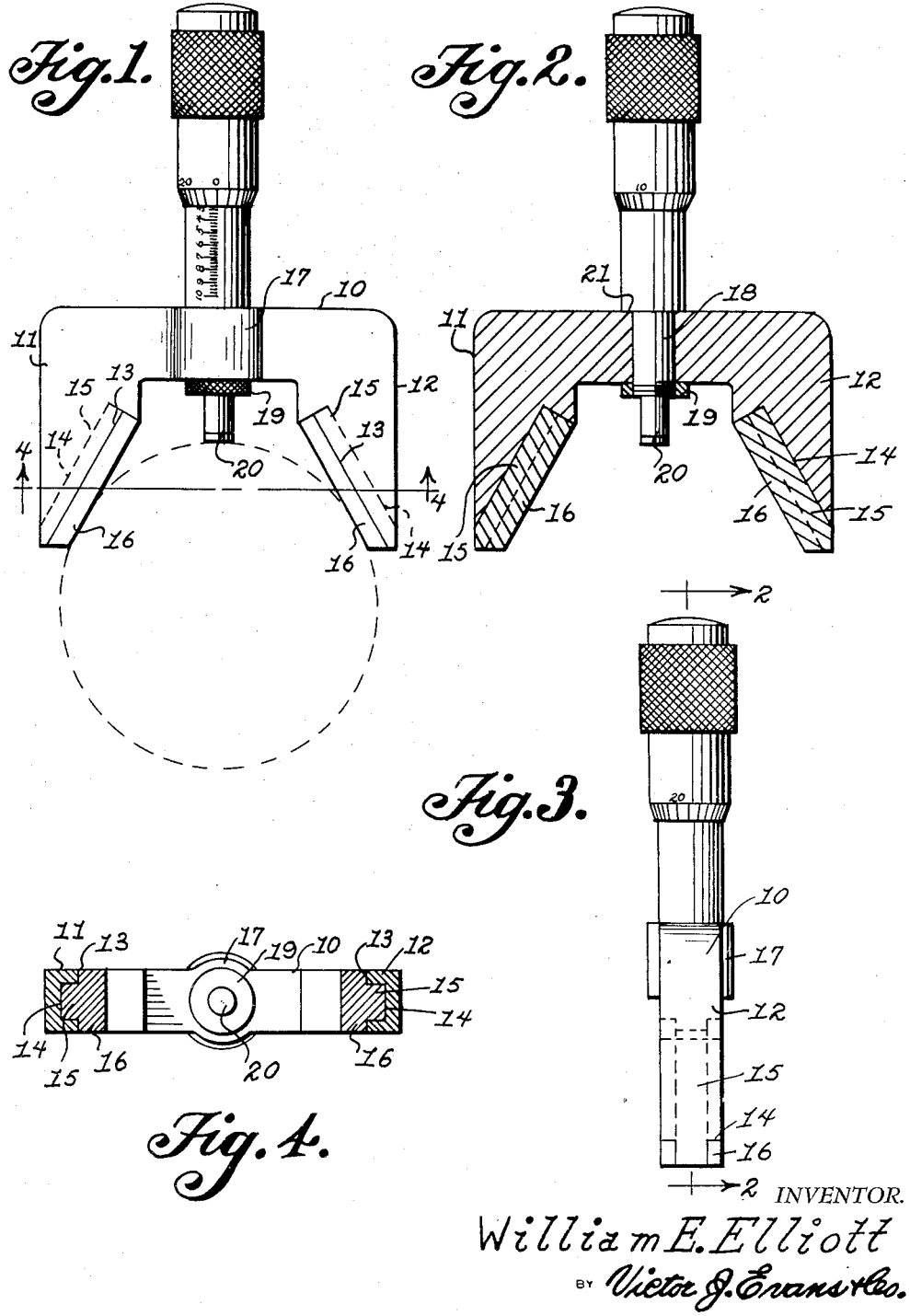

2,572,999

UNITED STATES PATENT OFFICE 2,572,999

MICROMETER WITH MAGNETIC V JAW

William E. Elliott, Clovis, N. Mex.

Application September 19, 1947, Serial No. 775,117

1 Claim. (Cl. 33—178)

This invention relates to improvements in gauges, and more particularly to the provision of a micrometer gauge for measuring the diameter of shafts.

It is an object of the micrometer to measure to one-thousandths of an inch, the diameter of a shaft in an automobile, truck or tractor, or in any internal combustion engine, without requiring the removal of the shaft.

A further object is the provision of a micrometer device for measuring the diameter of a worn crankshaft in an internal combustion engine for replacing under-size bearings without the necessity of pulling the crankshaft from a motor block.

A further object is the provision of a micrometer device for measuring the diameter of worn crankshafts, which enables measuring of diameters to be quickly and accurately made.

A still further object of the invention is to provide the micrometer device with highly magnetized inserts which will retain the device on the crankshaft during the measuring thereof.

These and other objects are attained by the novel construction and arrangement of parts hereinafter described and illustrated by the accompanying drawing, forming a part hereof, and in which:

Figure 1 is a front elevational view of a micrometer measuring device embodying the invention;

Figure 2 is a sectional view taken on the line 2—2 of Figure 3;

Figure 3 is a side view of the device; and

Figure 4 is a sectional view on the line 4—4 of Figure 1.

Referring to the drawings, the micrometer device is shown to comprise a yoke 10 having side legs 11 and 12, with internal surfaces 13 inclined to a precise angle of 60 degrees. The faces of the surfaces 13 are each provided with a centrally disposed groove 14 which is adapted to retain the centrally located tongue 15 of the metal insert 16. The inserts are made of a highly magnetized material and are retained in place by a press fit, welding or rivets or similar means of securing the inserts to the yoke.

The yoke is preferably made of metal of about ⅜ inch thick except at its center, where it is widened to provide an enlarged portion 17 with a hole to receive a cylinder 18 of a micrometer, which is provided with threads in engagement with a jam nut 19, by means of which the cylinder can be held in position. The cylinder can also be held in position by means of a set screw or similar means. Through the cylinder passes the movable member 20 of the micrometer.

In making a measurement, the lower half of the main bearing cap is removed, and the yoke held solidly with the flat surfaces of the inserts in the legs of the yoke squarely against the journal surface. At this position, the micrometer will be retired at number 20 and brought up slowly to rest firmly against journal with the inserts in the legs 11 and 12 held squarely and firmly to the shaft. The micrometer is then removed and read. This reading will disclose the exact diameter of the shaft being measured to enable user to determine the exact size of bearing needed.

The micrometer has a ledge 21 engaging the yoke 10 (see Figure 2) which cooperates with the nut 19.

The micrometer cylinder used is of standard reading of .050 per revolution with .001 graduation, the larger numbers starting at the bottom of yoke portion 20, or when micrometer cylinder is screwed in. By using this type of micrometer cylinder, the diameter of the shaft may be read directly.

The micrometer yoke will be made in two or more sizes to fit a wide range of crankshaft mains which are determined by length of legs 11 and 12, which must be not allowed to touch the motor block. The legs 11 and 12 of the yoke may be magnetized instead of using the separate inserts, which would aid the user in maintaining even contact with the surface of the bearing which is being measured, as do the inserts as previously described.

The use of a device of this character permits even an inexperienced person to make an accurate and efficient measurement.

The inserts are connected by a tongue and groove arrangement providing the greatest amount of magnetized metal with the simplest method of connection.

The above description is to be considered as illustrative and not limitative of the invention, of which modifications can be made without departing from the spirit of the invention and scope of the appended claim.

The invention having been described, what is claimed is:

In a micrometer device for measuring the diameter of a shaft, a yoke having a straight portion and spaced legs formed on the opposite ends of the straight portion in perpendicular relation thereto, with the outer surface thereof in a plane at right angles to the straight portion, with the inner surface thereof in inclined relation to the outer surfaces thereof and the inclination of the inner surfaces being at 60 degrees between the inner surfaces, centrally located grooves in the faces of said inclined inner surfaces, magnetized inserts having centrally located tongues thereon receivable in said grooves, said yoke having an enlarged portion at the center thereof with a hole therein extending in the same relative direction as the other surface of the legs, a micrometer mounted in the hole, and means mounted on the micrometer for retaining the micrometer in the yoke.

WILLIAM E. ELLIOTT.

REFERENCES CITED

The following references are of record in the file of this patent:

UNITED STATES PATENTS

| Number | Name | Date |
|---|---|---|
| 181,809 | Williams | Sept. 5, 1876 |
| 797,409 | Davis | Aug. 15, 1905 |
| 804,067 | Stowe | Nov. 7, 1905 |
| 1,312,546 | Karasick | Aug. 12, 1919 |
| 1,325,631 | Fields | Dec. 23, 1919 |
| 1,343,751 | Simmons | June 15, 1920 |
| 1,401,119 | Aldeborgh | Dec. 27, 1921 |
| 1,516,769 | Geist | Nov. 25, 1924 |
| 1,676,721 | Bartholdy | July 10, 1928 |
| 1,888,454 | Edson | Nov. 22, 1932 |
| 2,213,148 | Pyle | Aug. 27, 1940 |
| 2,321,888 | Baracskai | June 15, 1943 |
| 2,337,248 | Koller | Dec. 21, 1943 |

FOREIGN PATENTS

| Number | Country | Date |
|---|---|---|
| 6,055 | Great Britain | Mar. 16, 1903 |
| 49,000 | Sweden | Apr. 20, 1921 |
| 452,940 | France | Mar. 20, 1913 |